United States
Taylor

[11] 4,189,211
[45] Feb. 19, 1980

[54] WIDE ANGLE TELECENTRIC PROJECTION LENS ASSEMBLY

[75] Inventor: William H. Taylor, South Deerfield, Mass.

[73] Assignee: Kollmorgen Corporation, Hartford, Conn.

[21] Appl. No.: 866,229

[22] Filed: Jan. 3, 1978

[51] Int. Cl.² .......................... G02B 13/22; G02B 9/60
[52] U.S. Cl. .................. 350/175 TS; 350/204; 350/216
[58] Field of Search ............... 350/216, 175 TS, 216, 350/215 TS, 204

[56] References Cited
FOREIGN PATENT DOCUMENTS
43-22038 9/1968 Japan ............................. 350/175 TS

*Primary Examiner*—Conrad J. Clark
*Attorney, Agent, or Firm*—Morgan, Finnegan, Pine, Foley & Lee

[57] ABSTRACT

A wide angle telecentric projection lens system, having a long back focal distance, includes a front lens doublet, comprising negative and positive meniscus lens elements, located in front of an aperture stop, and a rear lens group on the other side of the aperture stop, the rear group comprising a rear lens doublet which includes positive and negative meniscus lens elements, the rear doublet having its curvature reversed relative to the front doublet but having an air space between its component lens elements, plus two biconvex lens elements slightly spaced from each other and from the second doublet. A beam splitting optical prism and/or similar optical element(s) may be included between the rear lens group and the object.

9 Claims, 13 Drawing Figures

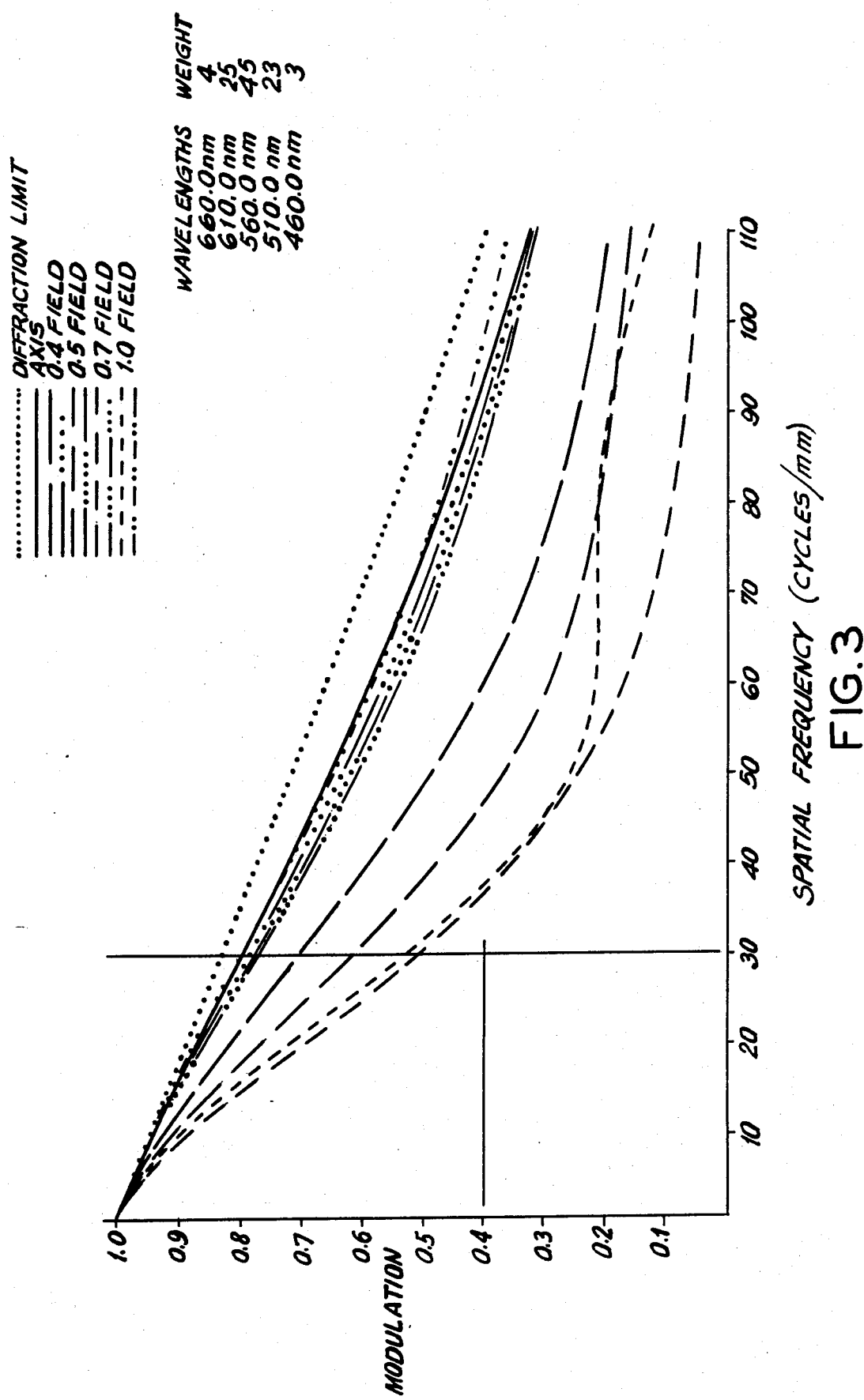

- - - - - - - 486.1 nm
——————— 587.6 nm
· · · · · · · · · 656.3 nm

WIDE ANGLE TELECENTRIC PROJECTION LENS ASSEMBLY

BACKGROUND AND OBJECTS OF THE INVENTION

The present invention relates generally to optical lens systems and more particularly to a wide angle telecentric lens assembly adapted to project an enlarged image of an object onto an image plane.

The prior art is replete with various projection lens assemblies for use in specific applications. In general, however, these lens assemblies do not have long back focal distances as compared with the overall equivalent focal length of the lens assembly. Moreover, such lens assemblies do not incorporate a telecentric entrance pupil (i.e., where the chief rays of the light beams entering the lens assembly are parallel). There are, however, certain projection applications, wherein a telecentric entrance pupil is required along with a beam splitting prism and/or similar optical elements positioned directly in front of the object, such as in a liquid crystal light valve projection system which includes a Xenon arc lamp projected into a refracting prism in a direction perpendicular to the optical axis for reflection back towards the object plane where it optically interacts with the light valve and a cathode ray tube to be reflected forward through the prism towards the image plane. Therefore, a lens assembly having a long back focal distance relative to the equivalent focal length of the lens assembly is required.

However, telecentric lens designs characteristically exhibit certain particular residual aberrations. These include pincushion distortion (as viewed on the projection screen), coma, field curvature, astigmatism, secondary lateral chromatic aberration and spherical aberration of the chief rays. Thus, the lens system must be capable of bringing all of these aberrations into an overall state of balance, resulting in a sharp, pleasing image over the entire field of view. In addition, as a matter of general lens design, such balance should be achieved with a minimum number of component lens elements.

Accordingly, it is an object of the present invention to provide a new and improved projection lens system. Another object of the invention is to provide a new and improved wide angle projection lens system.

It is also an object of the present invention to provide a new and improved wide angle projection lens system having a telecentric entrance pupil with a relatively long back focal distance.

It is an additional object of the present invention to provide a new and improved wide angle projection lens system having a telecentric entrance pupil and a relatively long back focal distance yet requires relatively few lens elements to provide nearly diffraction-limited imaging.

It is yet another object of the present invention to provide a new and improved wide-angle projection lens system having a telecentric entrance pupil and a relatively long back focal distance, which provides nearly diffraction limited imaging despite the presence of beam splitting and/or other optical elements between the object and the lens assembly.

It is still another object of the present invention to provide a new and improved wide angle projection lens system having a telecentric entrance pupil and a relatively long back focal distance, yet a finite F-number, which permits nearly diffraction-limited imaging despite the presence of beam splitting and/or other optical elements between the object and the lens assembly.

It is a further object of the present invention to provide a new and improved wide angle projection lens system having a telecentric entrance pupil and a relatively long back focal distance, which provides nearly diffraction-limited imaging with relatively good edge light illumination, despite the presence of beam splitting and/or other optical elements between the object and the lens assembly.

Objects and advantages of the present invention have been set forth in part above and in part below, or may be appreciated from the description herein or may be learned by practice with the invention, the same being realized and attained by means of the instrumentalities and combinations pointed out in the appended claims. Accordingly, the invention resides in the novel parts, structures, arrangements, combinations, and improvements herein shown and described.

SUMMARY OF THE INVENTION

Briefly described, the wide angle telecentric projection lens according to the present invention includes a front lens group located in front of an aperture stop and a rear lens group between the aperture stop and the object. As preferably embodied the front group comprises a front doublet of two meniscus lens elements—one positive in power and the other negative in power, combining as a negative meniscus lens when bonded together along adjacent surfaces—and the rear group comprises a grouping of four lens elements, including an uncemented doublet of two meniscus lens elements—one positive in power and the other negative in power, having an axial airspace between them and with their curvatures oriented opposite to those of the front doublet—plus two biconvex lens elements slightly spaced from each other and from the second doublet along the axis of the lens assembly.

A beam splitting prism and/or a similar optical element may be positioned between the object plane and the rear group of lens elements.

It will be found that the objects and advantages specifically enumerated herein are achieved by the invention as embodied herein. Accordingly, it will be found that a wide angle projection lens assembly may be provided in accordance with the present invention, which has a telecentric entrance pupil and a relatively long back focal distance with relatively few component lens elements.

It will also be found that a wide angle projection lens assembly may be made in accordance with the present invention, which has a telecentric entrance pupil and a back focal distance equal to about 1.6 of the equivalent focal distance of the assembly, with relatively little aberration in the projected image.

In addition, it will be found that a wide angle projection lens assembly may be provided in accordance with the present invention, having a telecentric entrance pupil and relatively long back focal distance, which provides nearly diffraction-limited imaging, no more than 5% distortion and at least 80% light illumination at the edge of the field, despite the presence of beam splitting or other optical elements between the object plane and the lens assembly.

It will be understood that the following detailed description is explanatory of the invention and is not intended to be restrictive thereof. Accordingly, the accompanying drawings, referred to herein and forming a part hereof, illustrate a preferred embodiment of the invention and, together with the description, serve to explain the principles of the invention.

BRIEF DESCRIPTION OF THE DRAWINGS

FIG. 3 is a graph showing the diffraction modulation transfer function (MTF) at various positions in the field, with the wavelengths weighted as indicated.

DETAILED DESCRIPTION OF PREFERRED EMBODIMENT

Figure 1:
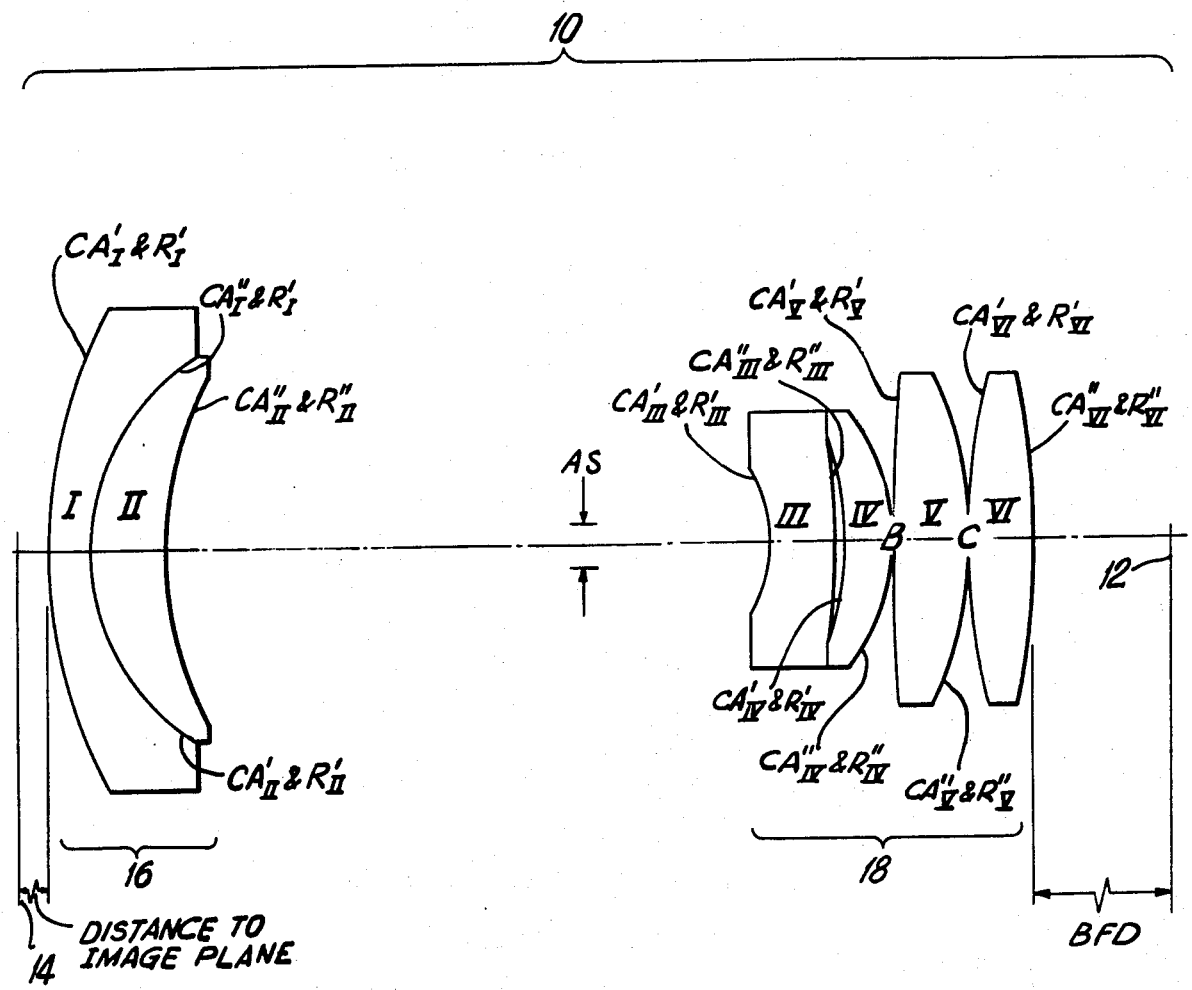
FIG. 1 is a sectional view of a wide angle projection lens system according to the present invention.

Referring now to the embodiment of the present invention shown in the accompanying drawings, wherein like reference characters refer to like parts throughout the various views, there is illustrated in FIG. 1, a projection lens assembly, indicated generally by reference number 10, adapted to be located in front of the object plane, indicated at 12, and behind the image plane, indicated at 14.

As here embodied, lens assembly 10 includes a front lens group comprising a lens doublet (indicated at 16) and a rear lens group (indicated at 18) positioned on opposite sides of the system aperture stop (indicated at A.S.), which may be provided by any suitable diaphragm or the like. As here embodied, lens doublet 16 includes meniscus lens elements I and II of which lens I is negative in power and lens II is positive in power. Lens elements I and II are positioned adjacent and in contact with each other. To this end, the radius of curvature of the abutting lens surfaces ($R''_I$ and $R'_{II}$ indicated in FIG. 1 and specified in Table 1, below) are identical. The lenses are bonded together by a suitable thermal-setting optical cement such as M-62 Lens Bond sold by Summers Laboratories, Inc., Fort Washington, Pennsylvania.

The rear group, 18, of lenses is positioned on the other side of the aperture stop, A.S., from lens doublet 16. Rear lens group 18 includes a second lens doublet made up of meniscus lens elements III and IV, of which lens III is negative in power and lens IV is positive in power, but having their curvatures reversed relative to lenses I and II. As preferably embodied, lenses III and IV are positioned adjacent each other to provide an air space between them and, advantageously, are proportioned to abut each other along their radially outermost lens surfaces to form an axial air space of substantial dimension. However, they need not be cemented together as lens doublet 16 is.

Rear group 18 also includes a pair of biconvex lenses V and VI. Lenses V and VI are positioned slightly spaced from each other and lens V, in turn, is positioned slightly spaced from lens IV of the second doublet. Advantageously, lens VI is spaced from the object by a distance equal to the back focal length of the overall lens assembly. It will be understood that lenses I–VI are mounted in a suitable housing for retaining the desired relative positions.

Figure 2:
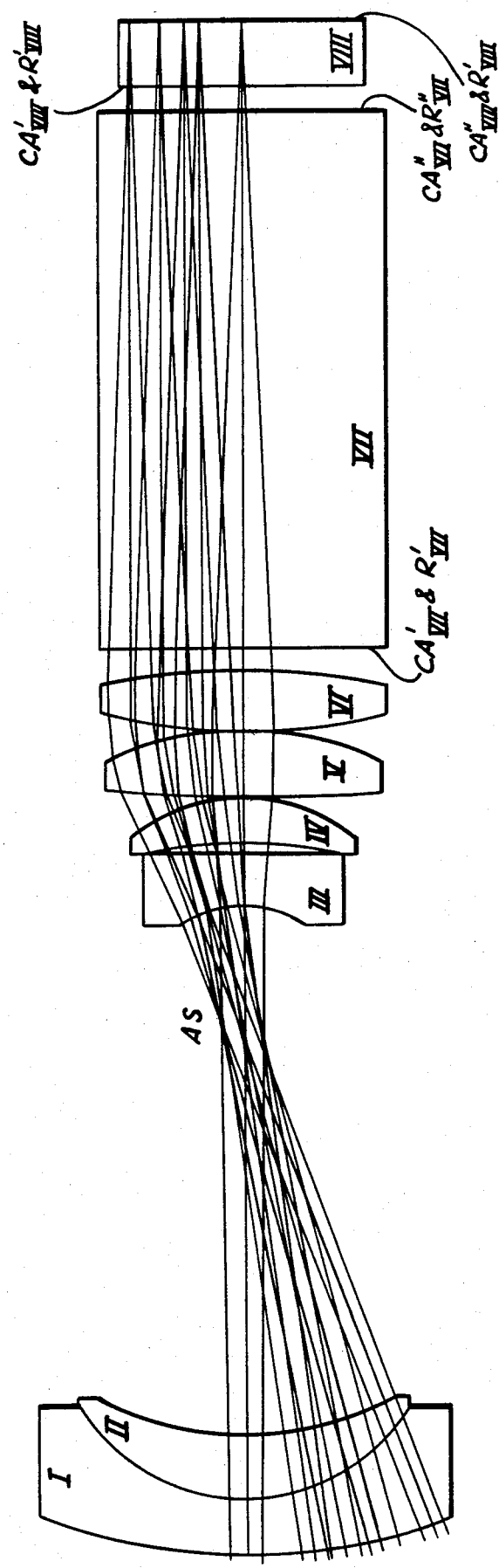
FIG. 2 is a sectional view of a light-ray trace pattern for the embodiment of FIG. 1, with optical elements positioned between the object and the rear lens group.

Referring now to FIG. 2, there is shown a ray trace diagram for an optical system utilizing the lens assembly according to the present invention. As here embodied, optical prism VII (which may be adapted to split the source beam into a desired pattern such as, for example, in a liquid light valve system and may, therefore, comprise two right angle prisms bonded together along their diagonal surfaces) and a relatively thin cover plate VIII (serving, for example, as an entrance window and being located directly adjacent the object plane 12) are positioned between object plane 12 and lens VI. The light emanating from object plane 12 is telecentric (i.e., it comprises pencil-like beams having the principal ray of each beam parallel to the others). After expanding through cover plate VIII and prism VII, the "pencil" beams are refracted by rear lens group 18 so as to merge at aperture stop A.S. Once transmitted through aperture stop A.S., the beams are optically corrected by front lens doublet 16 for essentially precise focusing on the image plane 14. Although not clearly suggested by the ray trace diagram in FIG. 2, the rays of each "pencil" beam emanating from lens doublet 16 are convergent at the imaging plane, and, prism element VII may be square in cross-section rather than rectangular, as suggested by FIG. 2.

Turning now to Table I, which has reference to the embodiments shown in FIGS. 1 and 2, specific parameters for the lens elements making up the lens assembly according to the present invention are tabulated.

TABLE I

| Lens | Radius of Curvature(mm) | Axial Distance Between Surfaces(mm) | Lens Aperture (mm) | $N_d$ | $V_d$ | Glass |
|---|---|---|---|---|---|---|
| Image | ∞ | | 2268 | — | — | — |
| | | 2470.4 | | | | |
| | +106.07($R'_I$) | | 74.0($CA'_I$) | | | |
| I | | 10.0(i.e.,$t_I$) | | 1.60310 | 65.41 | PSK52 |
| | +37.06($R''_I$) | | 59.71($CA''_I$) | | | |
| | | 0 | | | | |
| | +37.06($R'_{II}$) | | 59.71($CA'_{II}$) | | | |
| II | | 12.0(i.e.,$t_{II}$) | | 1.68893 | 31.18 | SF8 |
| | +59.76($R''_{II}$) | | 56.24($CA''_{II}$) | | | |
| | | 73.86 | | | | |
| A.S. | — | — | 0.288 | — | — | — |
| | | 25.54 | | | | |
| | −23.53($R'_{III}$) | | 23.24($CA'_{IV}$) | | | |

TABLE I-continued

| Lens | Radius of Curvature(mm) | Axial Distance Between Surfaces(mm) | Lens Aperture (mm) | $N_d$ | $V_d$ | Glass |
|---|---|---|---|---|---|---|
| III | | 10.6(i.e.,$t_{III}$) | | 1.68893 | 31.18 | SF8 |
| | −211.36($R''_{III}$) | | 35.17($CA''_{III}$) | | | |
| | | 1.11(air space) | | | | |
| | −85.05($R'_{IV}$) | | 35.17($CA'_{IV}$) | | | |
| IV | | 8.50(i.e.,$t_{IV}$) | | 1.62014 | 63.52 | PSK53 |
| | −32.75($R''_{IV}$) | | 39.33($CA''_{IV}$) | | | |
| | | 0.50 | | | | |
| | +346.78($R'_V$) | | 46.23($CA'_V$) | | | |
| V | | 11.80(i.e.,$t_V$) | | 1.62014 | 63.52 | PSK53 |
| | −66.97($R''_V$) | | 51.0($CA''_V$) | | | |
| | | .50 | | | | |
| | +119.38($R'_{VI}$) | | 51.0($CA'_{VI}$) | | | |
| VI | | 9.90(i.e.,$t_{VI}$) | | 1.52054 | 69.71 | PK50 |
| | −228.92($R''_{VI}$) | | 51.0($CA''_{VI}$) | | | |
| | | 5.0 | | | | |
| | ∞($R'_{VII}$) | (prism | 50.61($CA'_{VII}$) | | | |
| VII | | 100.0 thickness) | | 1.45846 | 67.83 | Fused Silica |
| | ∞($R''_{VII}$) | | 46.0($CA''_{VII}$) | | | |
| | | 4.93 | | | | |
| | ∞($R'_{VIII}$) | | 46.0($CA'_{VIII}$) | | | |
| | | (cover | | | | |
| VIII | | 12.5 plate thickness) | | 1.45846 | 67.83 | Fused Silica |
| | ∞($R''_{VIII}$) | | 45.0($CA''_{VIII}$) | | | |
| OBJECT | ∞ | 0 | 45.0 | — | — | — |

In Table I, a positive value for radius of curvature indicates that the center of curvature is on the object side of the particular lens element. A negative value indicates the center of curvature is on the image side of the lens element. The dimensions for the lens apertures refer to "all clear" values and the symbol $t_n$ refers to the thickness of the particular lens element. Prism VII is a solid block, representing an optical element (such as a beam-splitting prism in a liquid crystal light valve system) positioned in front of the object.

In addition, the lens system described in Table I provides the following lens characteristics. The lens system finite F/number is equal to 8.0. The back focal distance (BFD) is 122.43 mm (which includes the lengthening-out effect due to elements VII and VIII) and the equivalent focal length (EFL) of the system is 53.3 mm. The nominal magnification of the entire lens system is 48 and the overall track length is 2757.1 mm.

Moreover, the lens system shown in FIG. 2 and described in Table I achieves the following performance parameters. The field of view (FOV) is 48° with a maximum distortion of 5%. The edge light is 100% at 0.9 of the field and consistently greater than 80% at the edge of the field, all with a telecentric entrance pupil; the image size is 2265 mm. in diameter for an object 45 mm. in diameter. In addition, the parameters described herein were achieved with the following tolerances: all lens concentricities and the Aperture Stop diameter within ±0.002"; the axial space between lenses II and III within ±0.010"; and the axial space between lenses IV and V as well as that between lenses V and VI within ±0.005".

It will be understood by those skilled in the art that the relatively liberal nature of the foregoing tolerances enables the lens assembly to be fabricated and assembled without costly "fine tuning" mechanical adjustments. Thus, the lens system is advantageously suited to relatively high volume production.

Turning now to FIG. 3, there is shown a graph of the diffraction MTF for the spectral range of visible light projected by the lens system. It will be appreciated that the curves corresponding to the sagittal plane are substantially close to the diffraction limits (i.e., the theoretically perfect lens). In addition, although not as close to the diffraction limit as the sagittal plane values, the tangential values are still very good, particularly in view of the telecentric entrance pupil and the long back focal distance. The wavelengths used and the weightings therefor are based on the optical lens, the source and the detector spectral characteristics. The assumed source is Illuminant C and the detector is assumed to have the spectral sensitivity of the eye (i.e., the photopic eye).

Figure 4A:
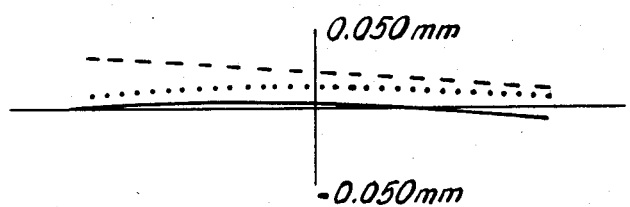
FIGS. 4a, 5a, 6a, 7a and 8a are graphs showing the results of ray tracing from long to short conjugate with the ray intercepts (i.e., vertical axis) in the tangential plane of the image plotted against the normalized entrance pupil ray (x-axis) at, respectively, 100%, 70%, 50%, 35% and 0% (i.e., on the axis) of the field for the wavelengths indicated.
Figure 4B:
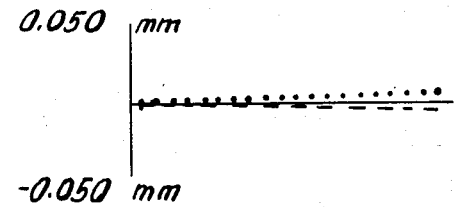
FIGS. 4b, 5b, 6b, 7b and 8b are graphs showing the results of ray tracing from long to short conjugate with the ray intercepts of the image plotted against the normalized entrance pupil ray (x-axis) at, respectively, 100%, 70%, 50%, 35% and 0% of the field for the wavelengths indicated.
Figure 5A:
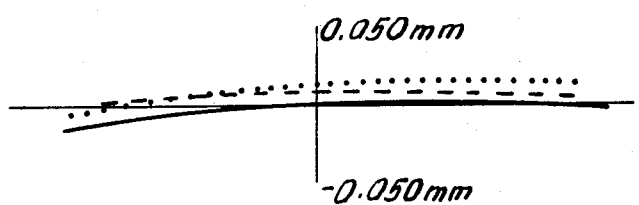
Figure 5B:
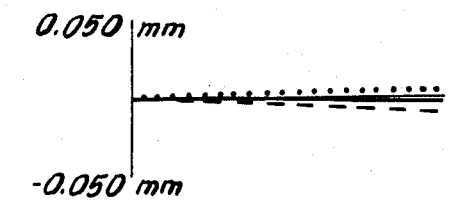
Figure 6A:
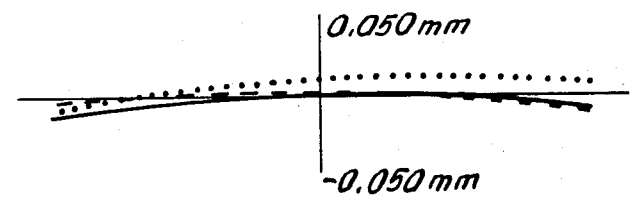
Figure 6B:
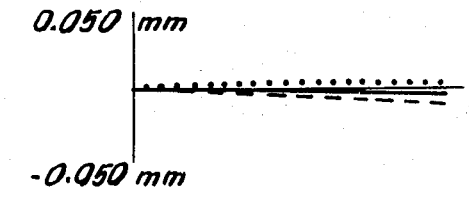
Figure 7A:
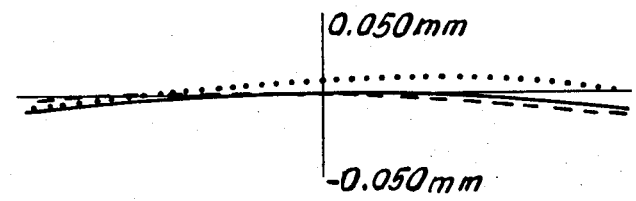
Figure 7B:
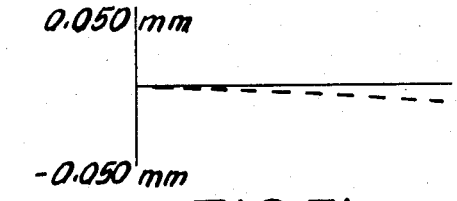
Figure 8A:
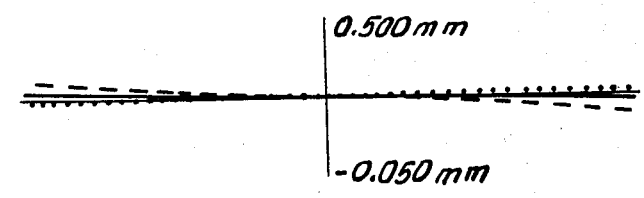
Figure 8B:
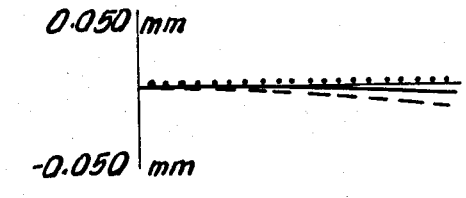

Similarly, turning to FIGS. 4a and b through 8a and b, there are shown graphs of the aberrations for the principal visible wavelengths of light. It will be appreciated by those skilled in the art that the lens system according to the present invention provides enlarged projection with relatively little chromatic aberration, as these wavelengths are known to be indicative of good overall optical performance and are particularly useful for indicating corrections to various visual systems.

Although the lens system shown in FIG. 1 and described in Table I is principally intended to provide a projection lens system, it will be found that a lens system made up of lens elements I–VI can be used as an objective lens by positioning a large object at the present image plane, 14, location. A small, well corrected image will be formed at the present object plane, 12.

When used as an objective lens system, the lens assembly shown in FIG. 1 is particularly suited for use in such applications as a periscope, wherein a particular field of view is transferred from one end of a long narrow tube to the other. This lens assembly is particularly advantageous for such applications because of the relatively large axial space between lens elements II and III and by the long back focal distance. Thus, the lens assembly can accommodate one or more folds in the optical axis between lens elements II and III, such as, for example, by positioning a small mirror at the present location of the aperture stop, A.S.

Thus, it will be understood by those skilled in the art that the invention is not limited to the specific embodiments herein described. Thus, for example, the performance of the lens assembly according to the present invention, such as the wide angle of projection and the nearly diffraction —limited imaging are not dependent on the particular values for the indices of refraction ($N_d$) and the Abbe constant ($V_d$) listed in Table I. Rather, optical material having similar refractive and dispersive properties may be used. In addition, it has been found that a prism element VII made of a 75 mm solid block of SF5 glass ($N_d=67270; V_d=32.21$) rather than the Fused Silica block may be utilized without affecting the performance parameters, thereby evidencing the versatility of the lens system according to the present invention.

Accordingly, variations may be made from the embodiments described herein, that are within the scope of the accompanying claims, without departing from the principles of the invention and without sacrificing its chief advantages.

What is claimed is:

1. A wide angle telecentric lens assembly comprising:
   a first meniscus lens element of negative power;
   a second meniscus lens element of positive power, said first and second lens elements being bonded together to form a front lens doublet;
   an aperture stop positioned behind said front lens doublet;
   a third meniscus lens of negative power positioned behind the aperture stop;
   a fourth meniscus lens of positive power positioned behind and adjacent said third lens element to provide an air space therebetween, the third and fourth lens elements having radii of curvatures reversed to that of said front doublet;
   a fifth biconvex lens element positioned behind said fourth lens element, generally close thereto; and
   a sixth biconvex lens element positioned behind said fifth lens element, said third, fourth, fifth and sixth lens elements forming a rear lens group adapted to refract light from an object through said aperture stop and said front lens doublet adapted to correct the light rays transmitted through said aperture stop for essentially precise focusing on an image plane, said lens assembly having a relative long back focal distance as compared to the equivalent focal length of the lens assembly.

2. A lens assembly according to claim 1, wherein the radii of curvature $R'_I/R''_I$ through $R'_{VI}/R''_{VI}$, the indices of refraction $Nd_I$ through $Nd_{VI}$, the Abbe numbers $Vd_I$ to $Vd_{VI}$ and the thicknesses and axial spacings are defined, within desired tolerances by the following data:

TABLE I

| Lens | Radius of Curvature(mm) | Axial Between Surfaces(mm) | $N_d$ | $V_d$ |
|---|---|---|---|---|
| I | +106.07($R'_I$) | 100.0 | 1.60310 | 65.41 |
|  | +37.06($R''_I$) | 0 |  |  |
| II | +37.06($R'_{II}$) | 12.0 | 1.68893 | 31.18 |
|  | +59.76($R''_{II}$) | 73.86 |  |  |

TABLE I-continued

| Lens | Radius of Curvature(mm) | Axial Between Surfaces(mm) | $N_d$ | $V_d$ |
|---|---|---|---|---|
| A.S. | — | 25.54 | — | — |
| III | −23.53($R'_{III}$) | 10.6 | 1.68893 | 31.18 |
|  | −211.36($R''_{III}$) | 1.11(air space) |  |  |
| IV | −85.05($R'_{IV}$) | 8.50 | 1.62014 | 63.52 |
|  | −32.75($R''_{IV}$) | 0.50 |  |  |
| V | +346.78($R'_V$) | 11.80 | 1.62014 | 63.52 |
|  | −66.97($R''_V$) | .50 |  |  |
| VI | +119.38($R'_{VI}$) | 9.90 | 1.52054 | 69.71 |
|  | −228.92($R''_{VI}$) |  |  |  | where lens I is said first meniscus lens element, lens III is said third meniscus lens element, lens IV is said fourth meniscus lens element, lens V is said fifth lens element, lens VI is said sixth lens element and A.S. is said aperture stop.

3. A lens assembly according to claim 2 wherein the tolerances for said lens assembly are such that lens concentricities of all said lens elements are within about ±0.002", the axial air space between lens elements II and III is within about ±0.010" and the axial air spaces between lens elements IV and V and between lens elements V and VI are within about ±0.005".

4. A lens system according to claim 2 which further includes a prism element positioned behind said sixth biconvex lens element, and a cover plate positioned between said prism and the object.

5. A lens assembly according to claim 4, wherein the front surface of said prism element is spaced about 5.0 mm from said sixth lens element and said prism about 100 mm thick, having an index of refraction of about 1.45846 and an Abbe number of about 67.83 and wherein said cover plate is about 12.5 mm thick and is positioned with its front surface about 4.93 mm from said prism, said cover plate having an index of refraction of about 1,45846 and an Abbe number of about 67.83.

6. A lens system according to claim 5, wherein the tolerances for said lens assembly are such that lens concentricities of all said lens elements are within about ±0.002", the axial air space between lens elements II and III is within about ±0.010" and the axial air space between lens elements IV and V and between lens elements V and VI is within about ±0.005".

7. A lens system according to claim 4, wherein the front surface of said prism element is spaced about 5.0 mm from said sixth lens element and said prism is about 75 mm thick, having an index of refraction of about 1.6727 and an Abbe number of about 32.21, and wherein said cover plate is about 12.5 mm thick and is front surface about 4.93 mm from said prism, said cover plate having an index of refraction of about 1.45846 and an Abbe number of about 67.87.

8. A lens system according to claim 7, wherein the tolerances of said lens assembly are such that lens concentricities of all said lens elements are within about ±0.002", the axial air space between lens elements II and III is within about ±0.010" and the axial air space between lens elements IV and V and between lens elements V and VI is within about ±0.005".

9. A lens system according to claim 1 which further includes a prism element positioned behind said sixth biconvex lens element, and a cover plate positioned between said prism element and the object.

* * * * *